United States Patent [19]

Soma et al.

[11] Patent Number: 5,231,309
[45] Date of Patent: Jul. 27, 1993

[54] CURRENT LEAKAGE BREAKING CIRCUIT FOR A COPYING APPARATUS

[75] Inventors: Utami Soma; Seitaro Kasahara, both of Hachioji, Japan

[73] Assignee: Konica Corporation, Tokyo, Japan

[21] Appl. No.: 712,441

[22] Filed: Jun. 11, 1991

[30] Foreign Application Priority Data

| Jun. 15, 1990 | [JP] | Japan | 2-158365 |
| Jun. 19, 1990 | [JP] | Japan | 2-162330 |
| Aug. 24, 1990 | [JP] | Japan | 2-223039 |

[51] Int. Cl.$^5$ .................. H02H 3/08; H02H 3/28
[52] U.S. Cl. .................. 307/125; 355/202; 355/206; 361/45; 361/42
[58] Field of Search ............ 361/42, 43, 44, 45, 361/46, 49, 235; 355/202, 206, 557, 554, 570; 307/125

[56] References Cited

U.S. PATENT DOCUMENTS

| 4,320,433 | 3/1982 | Yamaki | 361/45 |
| 4,996,625 | 2/1991 | Soma et al. | 361/87 |

FOREIGN PATENT DOCUMENTS 60-76760  5/1985  Japan.
63-158847  1/1990  Japan.

*Primary Examiner*—A. D. Pellinen
*Assistant Examiner*—Aditya Krishnan
*Attorney, Agent, or Firm*—Finnegan, Henderson, Farabow, Garrett & Dunner

[57] ABSTRACT

An earth current leakage breaking circuit detects a current leakage in an AC line in a copying apparatus and breaks electrically the AC line. The circuit has a current difference detector which detects a difference in current between an incoming current and an outgoing current in AC lines which supply electric power from an AC power source to electrical loads in the apparatus. A control circuit which, when it detects an output signal from the current difference detector which continuously exceeds a reference level, turns off a relay provided to the AC lines. The control circuit has a timing generator which generates timings to start driving the loads, and a reference level generator which generates the reference level being variable in accordance with the generated timings.

5 Claims, 7 Drawing Sheets

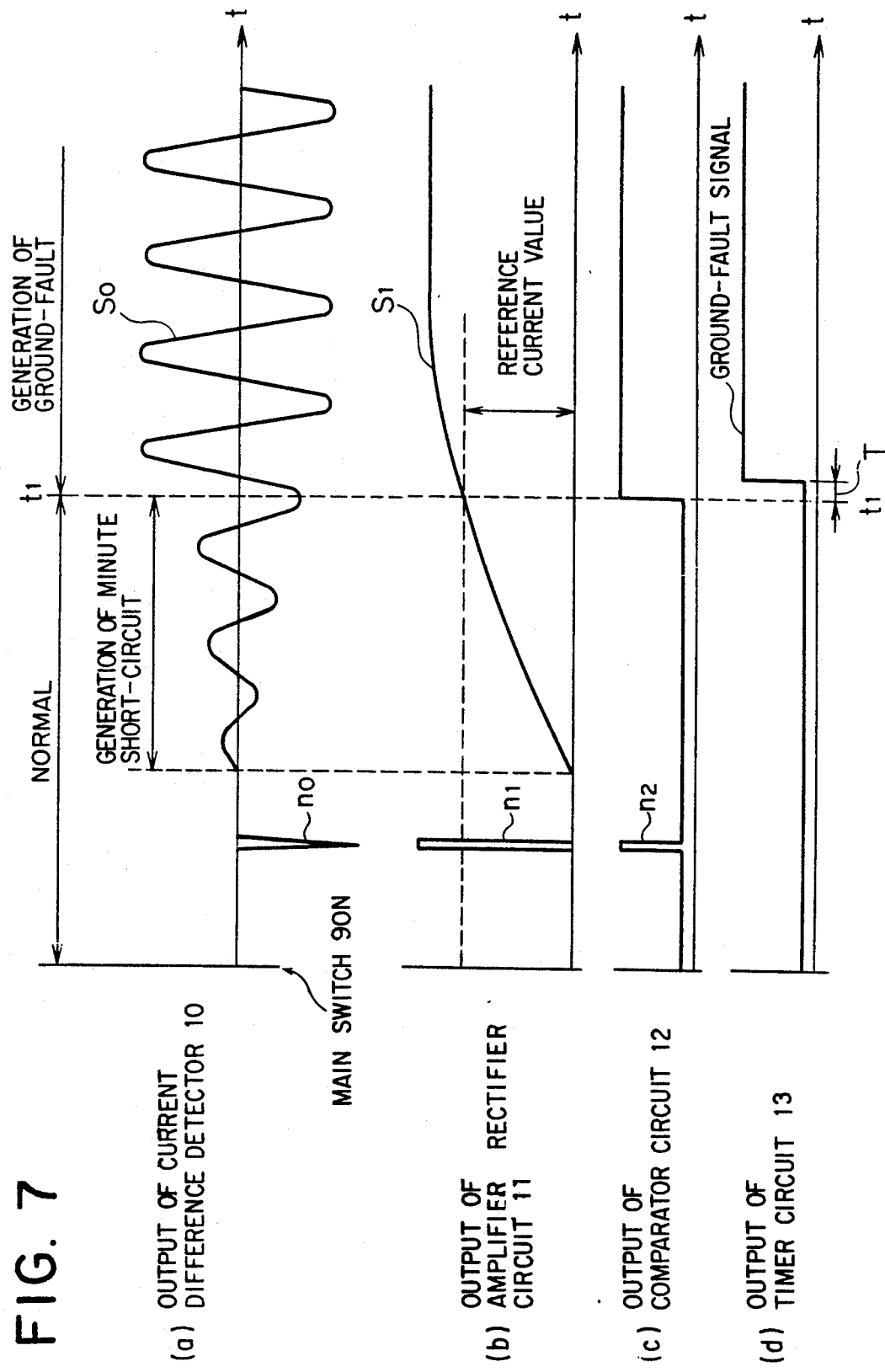

CURRENT LEAKAGE BREAKING CIRCUIT FOR A COPYING APPARATUS

BACKGROUND OF THE INVENTION

The present invention relates to an earth leakage breaking, or ground fault, circuit which detects an earth leakage on an A.C line in a copying apparatus and breaks electrically the A.C line. Furthermore, the present invention relates to a safety circuit of a copying apparatus, and especially relates to a safety circuit which detects a short circuit of an A.C line in a copying apparatus to the copying apparatus frame.

A.C lines in a copying apparatus are naturally connected to an A.C power source which supplies A.C electric power. A D.C power source such as a low tension power source unit of about five volts which drives a control circuit or the like, A.C loads such as a fixing lamp for a fixing unit, and an exposure lamp or the like, and a driver which drives A.C loads are connected to the A.C line.

A plurality of D.C motors, and solenoids or the like as well as a control circuit are connected to the D.C power source, which supplies D.C electric power energy.

As described above, the control circuit is driven by the D.C electric power, and controls a driver to control drive for A.C and D.C loads.

Especially, the load, to which electric power energy is directly supplied from an A.C line, such as a fixing lamp and an exposure lamp, is subject to ignition caused by a ground fault. From the aforesaid background, the inventor of the present invention has developed an earth leakage breaking control circuit which prevents, in advance, such a ground fault accident.

As a means to detect a current difference between A.C lines, there has been widely known a zero-phase current transformer (so-called ZCT), in which coils are wound around A.C lines to provide a detection circuit including the coils. In the means, when there is a current difference between the values of currents incoming and outgoing through the A.C lines, electric potential is generated by electromagnetic induction across both ends of a coil C, and current is obtained through the detection circuit connected to the means.

FIG. 2 is a time chart which shows an output current from a detection circuit, to which a current difference detection means provided on an A.C line in a common copying apparatus is connected.

In FIG. 2, the current which is generated in the current difference detection means and flows through the detection circuit is about 2 to 3 mA, when a ground fault is not caused. The detection circuit detects a large amount of current when electrical loads are started or a power switch is turned on. The case in which the detection circuit detects a large amount of current, except the case of a ground fault, will be described as follows.

The sign $t_1$ shows that an unbalanced current which is generated when a main switch is turned on, that is, A.C power supply is started on A.C lines, is generated in the current difference detection means and detected by the detection circuit. The unbalanced current, in this case, is not a current caused by a ground fault in an A.C line, but is a transient unbalanced current generated when a capacitor is charged in a D.C power source. In this case, the value of the current generated transiently in the detection circuit is about 150 mA.

During the period from $t_1$ to $t_2$, the control circuit conducts an initializing for control and an output from the detection circuit is not inputted into the control circuit. The control circuit begins to drive A.C loads and D.C loads after the point of $t_2$ and reads in the output from the detection circuit to start processing ground leakage detection.

The time chart in FIG. 2 shows that A.C loads or D.C loads are started at the time of $t_3$ through $t_7$, and the detection circuit momentarily detects the current of about 30 mA at each point of time. The current at each time is not always a current due to the ground fault in the A.C line, but is a transient unbalanced current as described above.

In order not to detect the transient current which is not caused by the ground fault unlike the foregoing, it is considered that a capacitor or a timer is provided on an output stage of the detection circuit so that the noise can be absorbed. In this way, however, a response of the circuit after the detection of the ground fault has been deteriorated, resulting in a failure of the sure monitoring of a ground fault and complicated circuit structure.

Furthermore, even if the copying apparatus is interrupted by the start of the earth leakage breaking circuit, the cause of the interruption can not be cleared up, and when the copying apparatus is started again repeatedly, there is the risk of the occurrence of an earth leakage accident.

Generally, a copying apparatus is provided with a plurality of A.C loads such as a heater, a motor, and accordingly is provided with many A.C lines which supply an electric power to the A.C loads.

These A.C lines have the risk of a short circuit (it is called a ground fault, hereinafter) to a copying apparatus body or various grounded portions therein. When the ground fault occurs, the electric potential of the whole copying apparatus frame rises up to that on one end of the A.C power source. Therefore, when a user touches a conductive portion of a copying apparatus external parts, there is the risk of an electric shock. Further, when the ground fault occurs under an unstable condition, an electric arc is caused between a cable of an A.C line and a copying apparatus frame, resulting in a secondary accident such as smoke emission, ignition, and others.

Especially, when there is an ignitable material such as plastics in the vicinity of a place of the ground fault, it is very dangerous.

The result obtained from the experiment shows that the material emits smoke when the ground fault current from the A.C line is 4 to 5 A, and it ignites when the ground fault current is 6 to 7 A.

Therefore, as a measure to counter the above-described secondary accident, it is instructed in an instruction manual and others to ground a copying apparatus frame with a grounding wire. Various measure are taken such as making plastics widely used in a copying apparatus to be flame resisting, reviewing the A.C line for preventing the ground fault, and adding a fuse additionally to the A.C line. Furthermore, it is proposed to provide a household earth leakage circuit breaker on the A.C line.

However, any of the above-described measures to prevent a ground fault in a copying apparatus is not perfect. Regarding the grounding of an apparatus frame, it is not always perfectly conducted depending on the condition of the office where the copying apparatus is installed. Even if a fuse or a breaker is provided on the A.C line, it is not operated by a ground fault with a small amount of current. Therefore it is extremely dangerous, and can not be a perfect measure to prevent a ground fault.

SUMMARY OF THE INVENTION

The first object of the present invention is to provide an earth leakage breaking circuit wherein an erroneous operation caused by a noise is prevented and a response after the detection of a ground fault is not degraded, and circuit construction is easy.

The second object of the present invention is to provide a copying apparatus having functions of preventing re-starting of the copying apparatus when earth leakage occurs, and telling the occurrence of the earth leakage.

The third object of the present invention is to provide a safety circuit of a copying apparatus which detects a ground fault in an A.C line, prevents a secondary accident caused by an earth leakage, operates positively, and is inexpensive.

In order to accomplish the above-described objects of the present invention, an earth leakage breaking circuit comprises: a current difference detection means which detects a current difference between A.C lines which supply electric power from an A.C power source to electric loads; a control circuit which detects an output signal from the above-described current difference detection means, which continuously exceeds a reference level, and turns off a relay provided to the above-described A.C lines; a timing generator means which generates a timing signal to start the above-described loads; and a reference level generator means which changes the above-described reference level based on the timing signal from the above-described timing generator means.

In order to accomplish further the above-described objects of the present invention, a copying apparatus comprises: a current difference detection means which detects a current difference between A.C lines which supply electric power from an A.C power source to electric loads; a detection circuit to which the above-described current difference detection circuit is connected; a control circuit which detects a current which exceeds continuously a reference level in the above-described detection circuit, and turns off a relay provided on the above-described A.C lines; and a nonvolatile memory which records a control history of the above-described control circuit.

In order to accomplish yet further the above-described objects of the present invention, a safety circuit of a copying apparatus comprises: a current difference detection means which detects a current difference between A.C lines which supply electric power from an A.C power source to A.C loads; and a means to cut off the above-described A.C loads according to an output signal from the above-described current difference detection means, wherein the cut-off means is used also for a means to cut off the A.C loads at the time of an automatic shut-off or a service-call.

BRIEF DESCRIPTION OF THE DRAWINGS

FIGS. 7 (a) through (d) are time charts shown when a safety circuit of the present invention operates.

DESCRIPTION OF THE PREFERRED EMBODIMENTS

Figure 1:
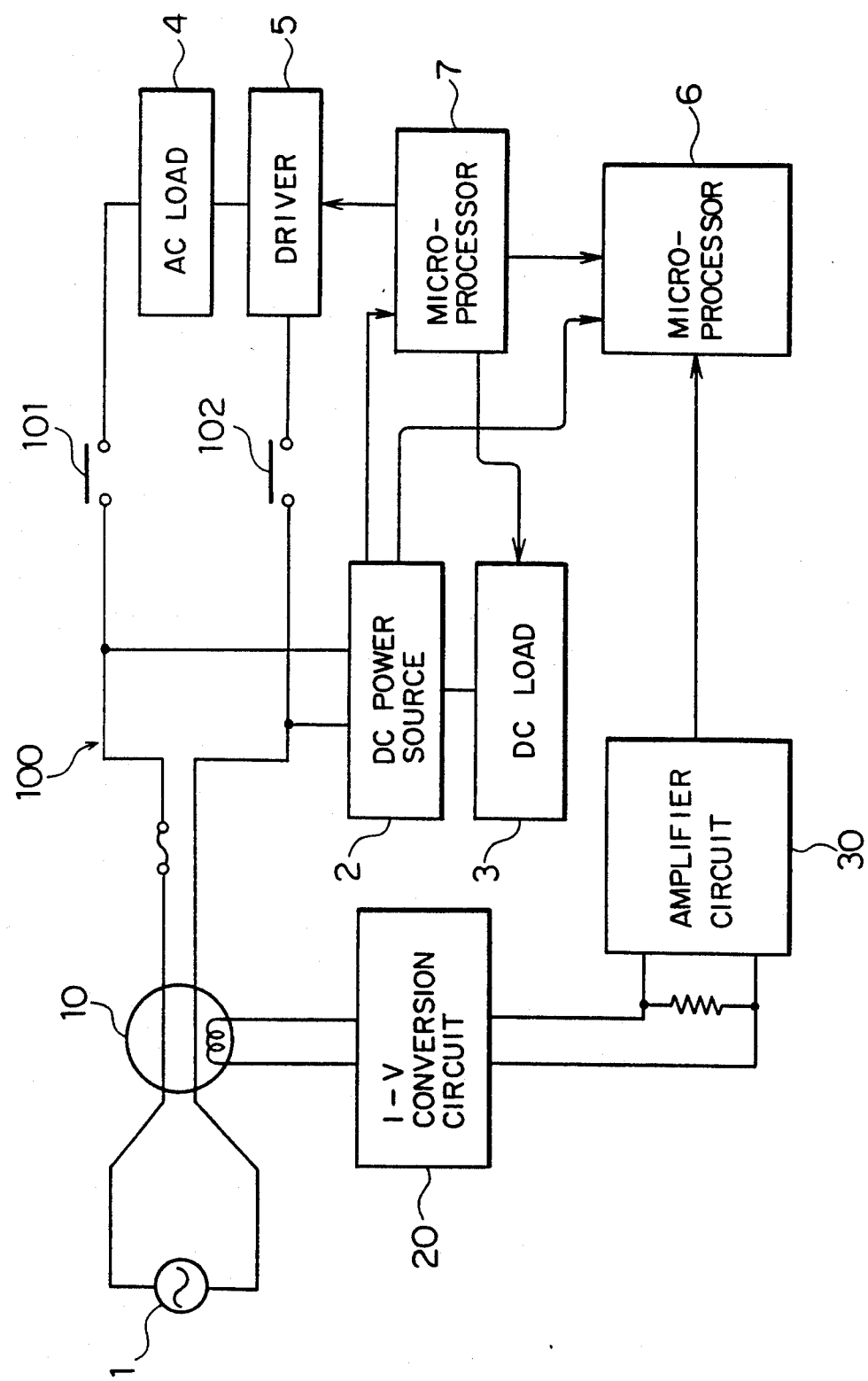
FIG. 1 is a block diagram which shows an example of an earth leakage breaking circuit of the present invention.

Referring to the drawings, the preferred embodiments of the present invention will be described as follows.

FIG. 1 is a block diagram which shows an example of the copying apparatus provided with an earth leakage breaking circuit of the present invention.

An electric system in a copying apparatus of the example is composed of an A.C line 100 which is connected to an A.C power source 1, a D.C power source 2 which is connected to the A.C line, an A.C load 4, a driver 5 which controls to drive the A.C load 4, a D.C load 3 which is connected to the D.C power source 2, microprocessors 6 and 7, a current difference detection means 10, an I-V conversion circuit 20 corresponding to a detection circuit, an amplifier circuit 30, and relays 101 and 102.

Each composition of the system will be described as follows.

The microprocessor 7 corresponds to a timing generator circuit, and is provided with an image formation routine which starts the A.C load 4 and D.C load 3 and conducts image formation processing through the driver 5 and the like, and stores previous timing to start each load from the time when a power switch is turned on. The microprocessor 7 starts the image formation routine to transmit a start signal to each load and, at the same time, transmits the same drive signal to the microprocessor 6.

The earth leakage breaking circuit of the example is a circuit which detects the difference between a incoming current and a outgoing current flowing through the A.C line 100 as a current through electromagnetic induction by means of the current difference detection means 10, and opens and closes a circuit connected to the A.C load 4 and the driver 5 which drives and controls the A.C load 4, through relays 101 and 102 by means of a control signal from the microprocessor 6 when the detected current exceeds continuously a reference level $R_{lev}$ for more than a predetermined period of time in the amplifier circuit 30 connected to the above-described detection means 10 through the detection circuit 20. It is composed of the amplifier circuit 30 which converts an extremely small amount of current flowing through the detection circuit 20 into voltage through an I-V conversion, and amplifies it to a predetermined level for outputting. In this case, the reference level $R_{lev}$ means criterion reference voltage. Although the I-V conversion circuit 20 is provided as the detection circuit in the example, the amplifier circuit 30 may be directly inputted with a current for processing by means of the current, by its value, instead of the I-V conversion circuit 20.

The microprocessor 6 is provided with an earth leakage breaking routine that controls the relays 101 and 102 which cut off, from the A.C line 100, the A.C load 4 and the driver 5 which controls the drive of the A.C load, and further is provided with a reference level generator means which generates different reference levels $R_{lev}$.

The microprocessor 6 has an analog input port into which an analog signal is inputted, and the analog signals inputted into the port are A-D converted into digital data composed of 8 bits, which can express 256 gradation, for the following processing. The following process, in this case, is the earth leakage breaking routine. The earth leakage breaking routine compares the value of the current flowing through the detection circuit with the reference level which is set by the reference level generator means, judges whether the current continues for a predetermined period of time or not, and thereby controls to open or close a circuit, to which the A.C load is connected.

The microprocessor 6 sends out a control signal in a high level state and opens the relays 101 and 102 when the input signal from the amplifier circuit 30 exceeds the reference level $R_{lev}$ continuously for a predetermined time, and thereby opens for breaking the circuit, which is connected to the A.C load 4 and the driver 5, from an A.C line.

The reference level generator means is an internal memory such as a RAM or ROM which composes the microprocessor 6, and outputs different reference levels $R_{lev}$ depending on an input signal from the timing signal generator means. In the example, the reference levels are levels corresponding to 15 mA and 40 mA respectively. Since the reference levels are I-V converted by the I-V conversion circuit 20 and inputted into the microprocessor 6, the levels correspond to voltage levels. The reference level generator means is one of the means which composes the earth leakage breaking routine. When the routine has not the I-V conversion circuit, the data of the reference level generating means correspond to current levels.

The microprocessor 6 sends out a control signal in a low level state to the relays 101 and 102, when the input signal does not exceed the reference level $R_{lev}$ continuously for a predetermined time.

The current difference detection means 10 is a sensor for a zero-phase current transformer, for example, (so-called ZCT, hereinafter referred to as a ZCT), which is composed of a coil wound around the A.C line 100, wherein voltage is generated across both ends of the coil by the action of electromagnetic induction when there is a current difference between the values of currents incoming and outgoing through the A.C lines.

The detection circuit 20 is a circuit which connects the ZCT 10 and the amplifier circuit 30, and is an I-V conversion circuit which I-V converts an extremely small amount of current generated in the ZCT 10 and inputs the result into the amplifier circuit 30.

The amplifier circuit 30 is a circuit which amplifies an extremely small amount of A.C input signal to a predetermined level, specifically to a processing level of the microprocessor 6, and further rectifies the A.C signal to output it.

The relays 101 and 102 are thyristors, for example, and are self-holding type relays which hold the conducting state of a current until the next trigger signal is detected, once a current has started flowing therethrough. It should be noted that the relay may also be an electromagnetic type relay without being limited to the thyristor. Further, it should be noted that the relay may also be a non-self-holding type relay without being limited to the self-holding type relay.

Figure 2:
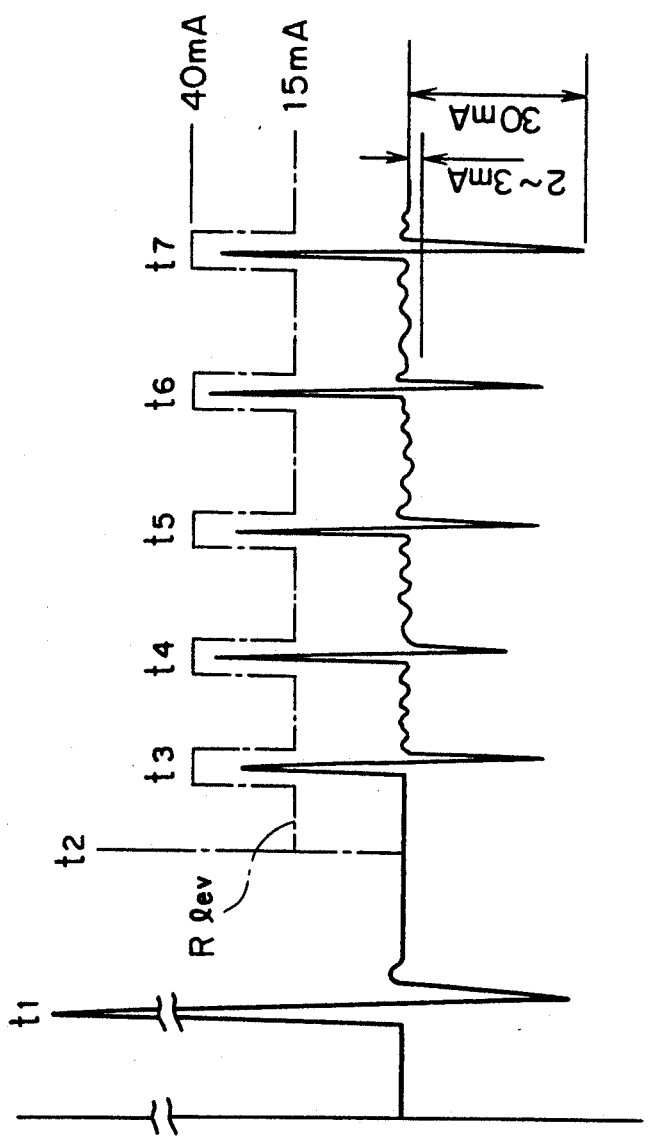
FIG. 2 is a time chart which shows an output current from a current difference detection means provided on an A.C line in a conventional copier.

Referring to FIG. 1 and FIG. 2, the operation of the earth leakage breaking circuit of the example will be described as follows.

Incidentally, a dashed line in FIG. 2 shows the reference level $R_{lev}$.

In the A.C line and D.C line, when a main switch is turned on at the time of $t_1$ in FIG. 2, the A.C current flows through the A.C line 100 and the D.C power source 2 is started. By the above operation, a low tension power source unit is activated in the D.C line. As the relays 101 and 102 are turned on at the time, a circuit, which connects the A.C load 4 and the driver 5 for driving it, is connected to the A.C line 100. By this operation, the electric power is supplied to the A.C load 4 and the driver 5. In the A.C line 100, the current difference is produced between the incoming current and the outgoing current at the above-described time. A current is generated in the ZCT 10 due to the above-described current difference, and the current of about 150 mA flows momentarily through the detection circuit 20 at the time $t_1$. However, as described above, the microprocessor 6 does not start the earth leakage breaking routine at the time $t_1$, therefore, the current signal of about 150 mA can not be detected.

Next, the operation in the D.C line at the time of an initializing operation will be described as follows. The electric power is supplied to the D.C load 3 and the microprocessors 6 and 7 at the time t; and thereafter. With this operation, the microprocessors 6 and 7 start initializing routines respectively at the time $t_1$ and complete the routines at the time $t_2$. The period of time from $t_1$ through $t_2$ is called an initializing time for convenience.

The microprocessor 6 reads in, during the initializing time, the reference voltage level data corresponding to 15 mA from the ROM, which corresponds to the reference level generator means, and initially sets an ordinary reference level $R_{lev}$.

The operation during the start of an image formation processing routine will be explained as follows.

The microprocessor 7 starts a process control routine corresponding to the timing generator means at the time $t_2$. On the other hand, the microprocessor 6 starts the earth leakage breaking routine at the time $t_2$.

The microprocessor 7 drives a fixing lamp through the driver at the time $t_3$, and at the same time, sends out a control signal to the microprocessor 6. The microprocessor 6 reads out, owing to the above-described control signal, the reference voltage level data corresponding to 40 mA from the ROM corresponding to the reference level generator means, and sets it to a control section.

In the A.C line 100, a surge current due to the load fluctuation is momentarily detected at the time $t_3$. As shown in FIG. 2, the detection circuit 20 detects momentarily a current of about 30 mA according to the above-described surge current and sends out it to the microprocessor 6. However, since the reference level $R_{lev}$ in the microprocessor 6 is changed to 40 mA as described above, the earth leakage breaking routine operates positively and the circuit, through which the A.C load 4 and the driver 5 are connected to the A.C line, is not opened.

When a predetermined time, for example, 10 msec has passed after the change of the reference level, the microprocessor 6 reads out the ordinary reference voltage level data from the ROM corresponding to the reference level generator means and sets the ordinary reference level $R_{lev}$ again. Namely, the ordinary reference level $R_{lev}$ is changed to 15 mA.

In the same way, the microprocessor 7 sends out the start signal successively to an optical motor as a D.C load, a main motor, an exposure lamp and a paper feed motor as A.C loads at the time of $t_4$ through $t_7$, and at the same time, sends out the same signal to the microprocessor 6. Due to this operation, the microprocessor 6 reads in the reference voltage level data from the ROM, changes the reference level and sets it again to the ordinary reference level, after a predetermined time has passed.

According to the above, the example of the present invention can provide an earth leakage breaking circuit with a simple circuit composition which can be positively operated by the detection of the current difference caused by the load change in the A.C line 100, and does not deteriorate the response time after a ground fault detection made during a period wherein the load change does not occur usually in the A.C line 100.

Figure 3:
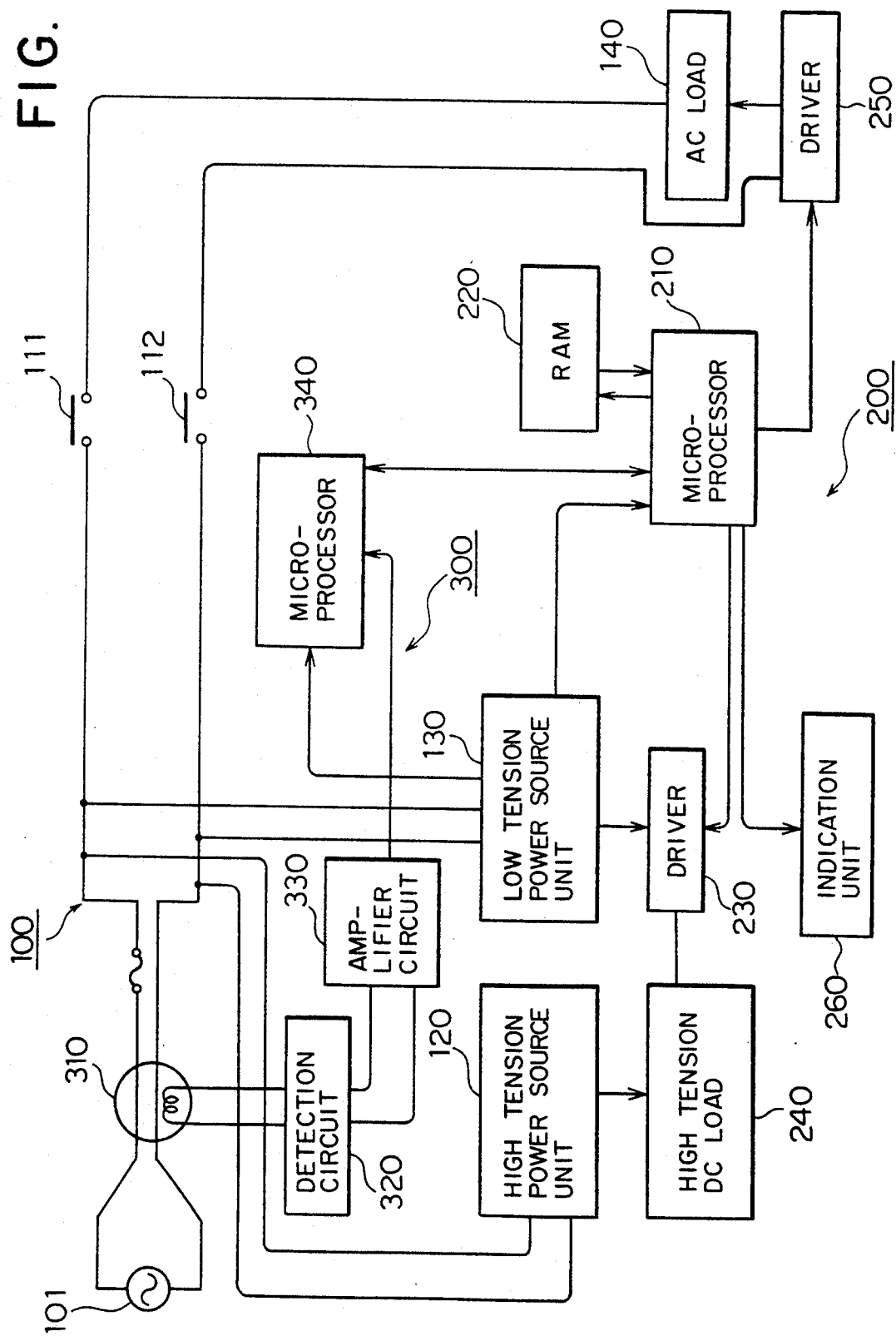
FIG. 3 is a block diagram which shows an example of an A.C line and a D.C line in the copying apparatus provided with an earth leakage breaking circuit of the present invention.

The copying apparatus of the example shown in FIG. 3 has various kinds of loads connected with the A.C line 100, conducts image forming processing through a process control circuit 200, and is provided with an earth leakage breaking circuit 300 and the function of monitoring the earth leakage in the A.C line and thereby prevents the earth leakage accident, and especially, with the function of preventing the re-starting of the copying apparatus when the power source is turned on after the copying apparatus has been stopped by occurrence of the earth leakage, and displays the occurrence of the earth leakage.

Composition of each section of the copying apparatus will be described as follows. First, connections to the A.C line 100 will be explained.

An A.C power source 101 is connected with the A.C line 100, which is connected with a high tension power source unit 120, and a low tension power source unit 130. The A.C line 100 is also connected to an A.C load 140 through relays 111 and 112.

Further, the A.C line 100 of the example is connected with an earth leakage breaking circuit 300, which is composed so that the A.C load 140 may be cut off from the A.C line 100 when the earth leakage is detected. In the earth leakage breaking circuit 300, the difference between incoming and outgoing currents is detected by a current difference detection means 310 as a current through electromagnetic induction action thereof, and an amplifier circuit 330 which amplifies and outputs the current flowing through a detection circuit 320 connected to the above-described detection means 310, and a microprocessor 340 that controls relays 111 and 112 which open and close the A.C line 100 for the A.C load 140 are connected thereto.

The earth leakage breaking circuit 300 is a circuit which detects, with the current difference detection means 310, the difference between incoming and outgoing currents flowing through the A.C line 100 as a current through the action of electromagnetic induction, and opens and closes, with a control signal from the microprocessor 340, the circuit which is connected with the A.C load 140 through relays 111 and 112, when the detected current flowing through the detection circuit 320 connected to the above-described detection means 310 exceeds the reference level $R_{lev}$ continuously for more than a predetermined time.

The microprocessor 340 is provided with an earth leakage breaking routine for controlling relays 111 and 112 which cut off the A.C load 140 from the A.C line 100, and a reference level generator means which generates different reference levels $R_{lev}$. The microprocessor 340 has an analog input port, into which is an analog signal is inputted, and the analog signal which is inputted into the port is A D converted into 8 bit digital data, which can express 256 gradation, for the following processing. The following process, in this case, is the earth leakage breaking routine. The earth leakage breaking routine is a routine which compares the value of the current flowing through the detection circuit 320 with the reference level $R_{lev}$ which is set by the reference level generator means, judges whether the current exceeds the reference level continuously for a predetermined time or not, and thereby controls to open or close a circuit to which the A.C load 140 is connected.

The reference level generator means is an internal memory such as a RAM or ROM which composes the microprocessor 340, and outputs reference levels $R_{lev}$ which vary depending on an input signal from the timing signal generator means. In the example, the reference levels $R_{lev}$ are corresponding to 15 mA and 40 mA respectively. The reference level generator means is one of the means which composes the earth leakage breaking routine.

The microprocessor 340 sends out a control signal in a low level state to the relays 111 and 112, when the input signal does not exceed the reference level $R_{lev}$ continuously for a predetermined time.

The current difference detection means 310 is a sensor such as a zero phase current transformer, for example, (so-called ZCT, hereinafter referred to as a ZCT), which is composed of a coil wound around the A.C line 100, wherein voltage is generated across both ends of the coil through the action of electromagnetic induction when there is a difference of the current value between incoming and outgoing currents flowing through the A.C line 100.

The detection circuit 320 is a circuit which connects the ZCT 310 to the amplifier circuit 330, and inputs an extremely small amount of a current generated in the ZCT 310 into the amplifier circuit 330.

The amplifier circuit 330 is a circuit which amplifies an extremely small amount of A.C input signal to a predetermined level, specifically to a processing level of the microprocessor 340, and further rectifies the A.C signal to output it.

The relays 111 and 112 are thyristors, for example, and are self-holding type relays which hold the conducting state of a current until the next trigger signal is detected, once a current started flowing therethrough. It should be noted that the relay may also be an electromagnetic type relay without being limited to the thyristor. Further, it should be noted that the relay may also be a non-self-holding type relay without being limited to the self-holding type relay.

Next, connections of the D.C line which is composed of a high tension power source unit 120 and a low tension power source unit 130, will be described as follows.

The high tension power source unit 120 is connected with a high tension D.C load 240. The low tension power source unit 130 is connected with drivers 230 and 250, and microprocessors 210 and 340. Although a low tension D.C power source 130 is not illustrated in the drawing, it supplies D.C power of about 5 V to a RAM 220 and a display unit 260 in the same way as the above.

A process control circuit 200 of the example will be described as follows.

The process control circuit 200 is composed of the microprocessor 210, the RAM 220, the drivers 230 and 250, the high tension D.C load 240, and the display unit 260.

The microprocessor 210 is provided with an image formation routine which drives the high tension D.C load 240, the A.C load 140 and a low tension D.C load through the drivers 230 and 250 to conduct image formation processing, and stores previously determined timing to start the loading of each load from the time when the power source is turned on. The microprocessor 210 starts the image formation routine, transmits a start signal to each load and, at the same time, transmits a drive signal to the microprocessor 340.

The RAM 220 is a non-volatile random access memory which holds recorded contents even if the power source is turned off, and is a memory which records the history of the copying apparatus such as, for example, the number of copies to be made, the dispersion of bias voltage of each load, and conditions such as the condition of error occurrence. Particularly, in the example, the RAM 220 stores the condition of earth leakage occurrence in the A.C line 100 and the condition of overheating occurrence of a fixing unit.

The driver 230 is a circuit which drives the high tension D.C load 240 such as a charger, a separator unit, a transfer unit, a developer unit, and the like.

The driver 250 is a circuit which drives the A.C load 140 such as an exposure lamp, a main motor, and the like. The low tension D.C load includes a D.C motor which drives each unit, a solenoid, and the like.

The display unit 260 is provided on an operation section. It is a unit which is composed of an LED or the like, and displays an error message such as a paper jam, and, especially in the example, can display an earth leakage occurrence message and a thermorunaway occurrence message of a fixing lamp.

Figure 4:
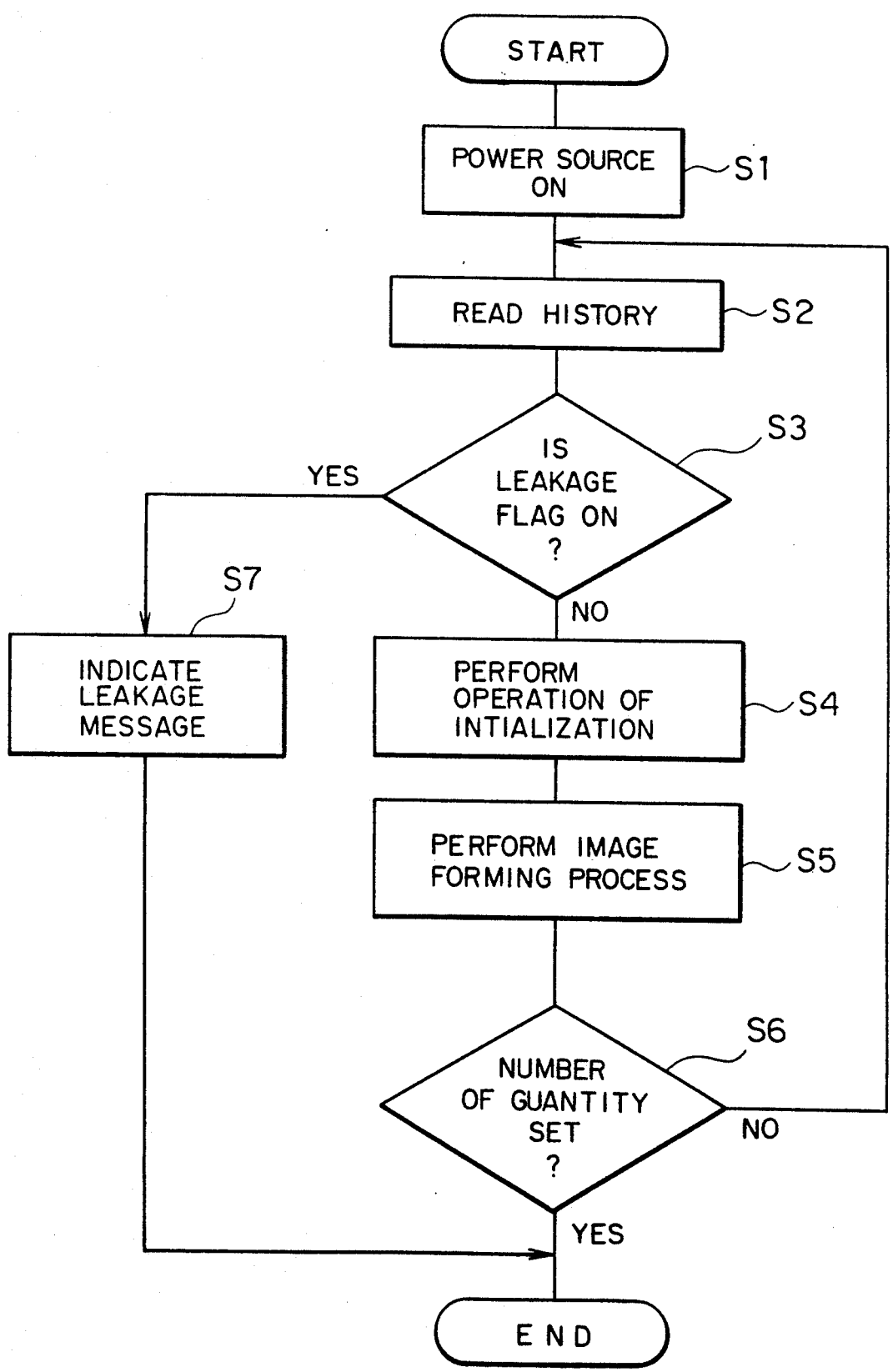
FIG. 4 is a flowchart which shows an operation of the copying apparatus of the example.
Figure 5:
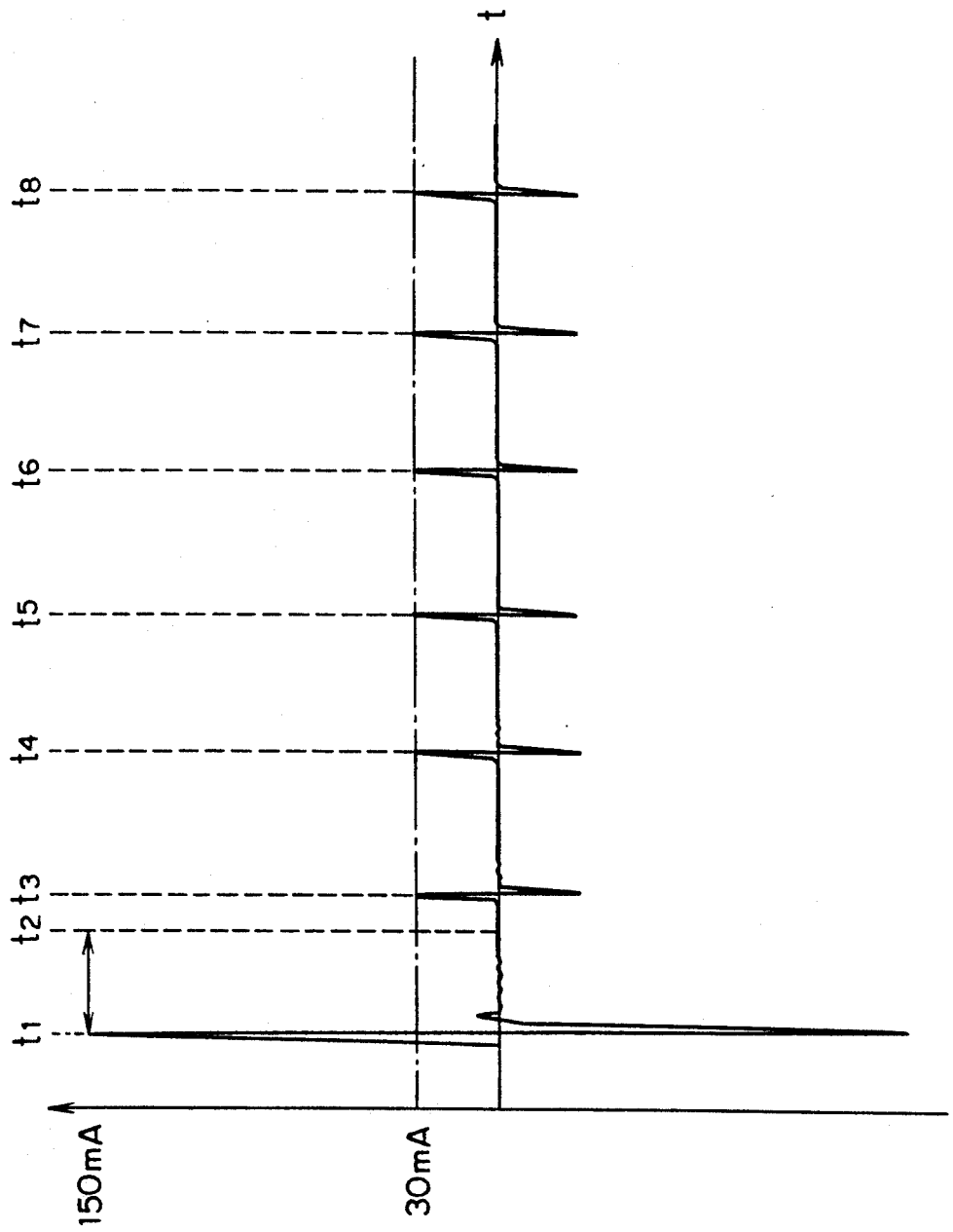
FIG. 5 is a time chart which shows an output current from a detection circuit to which the current difference detection means provided on an A.C line in the copying apparatus of the example is connected.

Referring to FIGS. 3 through 5, an operation of the copying apparatus of the example will be described as follows.

FIG. 4 is a flow chart which shows an operation of the copying apparatus of the example. FIG. 5 is a time chart which shows an output current from a detection circuit which is connected with a current difference detection means provided to the A.C line of the copying apparatus.

In the time chart shown in FIG. 5, a current which is generated in the current difference detection means 310 and flows through the detection circuit 320, is about 2 to 3 $\mu$A at an ordinary time when the ground fault does not occur.

When a main switch is turned on at the time of $t_1$ (S1), the A.C current flows through the A.C line 100 and the high tension power source unit 120 and the low tension power source unit 130 are started. Since the relays 111 and 112 are on the state of "on" in the A.C line, in this case, at the time, the A.C load 140 is connected to the A.C line 100. By this operation, the A.C electric power is supplied to the A.C load 140. In the A.C line 100, the current difference is produced between the incoming current and the outgoing current by transient unbalance caused by a charging current of a capacitor or the like at the above-described time. A current is generated in the ZCT 310 due to the above-described current difference, and the current of about 150 mA flows momentarily through the detection circuit 320 at the time $t_1$. However, as described above, since the microprocessor 340 does not start the earth leakage breaking routine at the time $t_1$, it does not detect the current signal of about 150 mA.

Next, the operation in the process control circuit 200 after the power source has been turned on will be described as follows. The high tension power source unit 120 supplies the electric power to the high tension D.C load 240 from the time $t_1$, and the low tension power source unit 130 supplies the power to the microprocessor 210, the RAM 220, the drivers 230 and 250, and the display unit 260 from the time $t_1$. From the above operation, the microprocessor 210 reads out the history information from the RAM 220 (S2), and detects the status of an earth leakage flag (S3). Since the status of the earth leakage flag is off, the microprocessors 210 and 340 start the initializing routine respectively, and complete the routine at the time $t_2$ (S4). The period of time from $t_1$ through $t_2$ is designated as an initializing time for convenience.

The microprocessor 340 reads in the reference level data corresponding to 15 mA from the ROM corresponding to the reference level generator means during the initializing time, and initially sets the ordinary reference level $R_{lev}$. The reference level at the time is 15 mA.

The microprocessor 210 starts the process control routine at the time $t_2$ (S5). On the other hand, the microprocessor 340 starts the earth leakage breaking routine at the time $t_2$.

The microprocessor 210 drives the fixing lamp through the driver 250 at the time $t_2$, and, at the same time, sends out the control signal to the microprocessor 340. The microprocessor 340 reads out the reference level data corresponding to 40 mA from the ROM by the above-described control signal, and sets the reference level $R_{lev}$ to the control unit.

A surge current due to the load change is momentarily caused to flow through the A.C line 100 at the time $t_3$. The detection circuit 320 momentarily detects a current of about 30 mA due to the surge current as shown in FIG. 3. However, as described above, since the microprocessor has the reference level $R_{lev}$ which is changed to 40 mA, the earth leakage breaking routine operates positively and does not open the circuit connecting the A.C load 140 to the A.C line 100.

When a predetermined time has passed after the change of the reference level $R_{lev}$, the microprocessor 340 reads out the ordinary reference level data from the ROM and sets the ordinary reference level $R_{lev}$ again. Namely, the ordinary reference level $R_{lev}$ is changed to 15 mA.

In the same way, the microprocessor 210 sends out the start signal successively to an optical motor as a D.C load, a main motor, an exposure lamp and a paper feed motor as A.C loads at the period of time from $t_4$ through $t_8$, and at the same time, sends out the same signal to the microprocessor 340. With this operation, the microprocessor 340 reads in the reference level data from the ROM, changes the reference level and sets it again to the ordinary reference level $R_{lev}$ after a predetermined time has passed. By the operation described above, the copying apparatus does not detect a transient current which is not caused by the ground fault, and conducts the image forming processing while preventing an erroneous operation.

Suppose that the ground fault occurs in the A.C line 100, and the microprocessor 340 cuts off the A.C load 140 through the relays 111 and 112 and stops the operation. At this time, the microprocessor 210 turns on the earth leakage flag by the signal from the microprocessor 340. The microprocessor 210 judges whether the number of copies to be made reaches a predetermined number or not (S6), and returns to Step 2 since the number of copies to be made does not reach the predetermined number. The microprocessor 210 reads in the history information from the RAM 220 (S2), detects the status of the earth leakage flag (S3), displays the earth leakage error message on the display unit 260 since the status of the flag is on (S7), and stops operations.

As described above, on the occasion of the earth leakage occurrence, the copying apparatus of the example stops its operation, and displays the earth leakage error message to tell an operator about the earth leakage. Further, since the copying apparatus of the example reads in the history information before the initial operation is conducted, detects the earth leakage occurrence from the information, and prevents re-starting of the copying apparatus, it can prevent the earth leakage accident.

Figure 6:
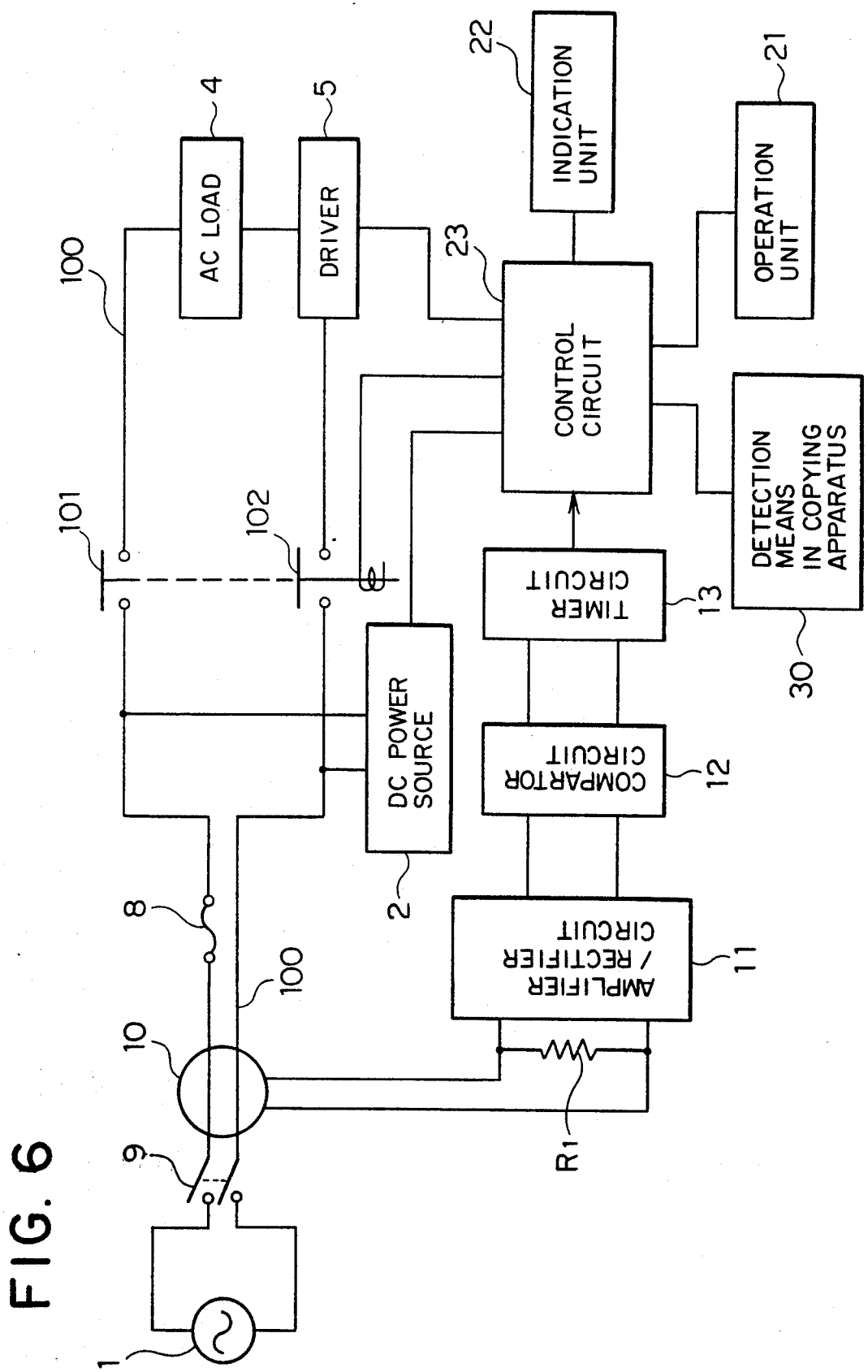
FIG. 6 is a block diagram which shows an example of the present invention.

In FIG. 6, the numeral 1 is an A.C power source, the numeral 4 represents A.C loads such as a heater for fixing, a pre-exposure discharger, and a high tension power source unit, or the like, the numeral 5 is a driver which drives the A.C load 4, the numeral 2 is a D.C power source which supplies D.C voltage to a control circuit 23 or the like, the numeral 100 is an A.C line, the numerals 101 and 102 are relays which are means for cutting off the A.C load connected to the A.C line, the numeral 8 is a fuse, the numeral 9 is a main switch, the numeral 10 is a current difference detector which is a current difference detection means provided near the introduction portion of the A.C power source 1 connected to the A.C line 100 in the copying apparatus, the numeral 11 is an amplifier/rectifier circuit, the numeral 12 is a comparator circuit, the numeral 13 is a timer circuit, the numeral 23 is a control circuit, the numeral 21 is an operation unit having a copy start button and an operation button such as a ten-key or the like which inputs the number of copies to be made, a code number, etc. into the control circuit 23, the numeral 22 is a display unit which displays the number of copies to be made, a service-call, etc., and the numeral 30 is a detection means in a copying apparatus which detects troubles found by the previous check which is conducted by the control of the control circuit 23 at the starting time of the copying operation of the copying apparatus, and an accident which occurs in the copying operation, and sends out an accident occurrence signal to the control circuit 23.

The relays 101 and 102 which are provided between the A.C load 4 and the A.C line 100 are relays which open and close an A.C power supply circuit to the A.C load 4 by the control of the control circuit 23.

The control circuit 23 is driven by the D.C power of about 5 V from the D.C power source 2, and conducts the control of the operation of the A.C load 4 by driving the driver 5, and the control for driving various kinds of D.C loads. D.C loads, in this case, mean the loads which are driven by the D.C power, such as, for example, the above-described relays 101 and 102, a D.C motor, a solenoid, etc..

When no operation is conducted to the operation unit 21, even if a predetermined time, for example, of 2 minutes through 6 minutes has passed after a main switch 9 has been turned on or a copying has been conducted once, the control circuit 23 conducts an automatic shut-off operation which opens the relays 101 and 102 to cut off the power supply to the A.C load 4 for saving the electric power, further opens the relays 101 and 102 by the fault signal which is sent out from the detection means 30 in the copying apparatus when a fault which needs a service call occurs, for cutting off the power supply to the A.C load, and displays the service call, a fault portion, or the like on the display unit 22.

In the present invention, the following safety circuit is used also as the above-described relays 101 and 102 for cutting off the power supply to the above-described A.C load 4 when a ground fault occurs.

When the A.C line is composed of 2 wires, for example, the safety circuit of the example monitors a current difference between the two wires, and sends out the ground fault signal to the control circuit 23 when the current difference exceeds the reference value continuously for a time more than a prescribed time, and the control circuit 23 opens the relays 101 and 102 to cut off the power supply to the A.C load 4, and the safety circuit is composed of the current difference detector 10, the amplifier / rectifier circuit 11, the comparator circuit 12, the timer circuit 13, the relays 101 and 102, and the control circuit 23.

The current difference detector 10 is a zero-phase current transformer, for example, in which A.C voltage is induced when the current difference is generated between respective A.C lines 100, and an A.C current flows through a resistance load $R_1$. Accordingly, A.C signal voltage is generated across both ends of the resistance load $R_1$.

The amplifier / rectifier circuit 11 is a circuit which amplifies and rectifies the A.C signal from the current difference detector 10 into a D.C signal current and sends out it to the comparator circuit 12.

The comparator circuit 12 is a circuit which compares the signal current from the amplifier / rectifier circuit 11 with a reference current, and outputs a low level output when the signal current is equal to or lower than the reference current, and outputs a high level output when the signal current exceeds the reference current.

The timer circuit 13 is a circuit which outputs, for example, a high level output when the high level status of the output signal from the comparator circuit 12 continues for more than a predetermined time, and sends out the ground fault signal to the control circuit 23.

The control circuit 23 opens the relays 101 and 102 to cut off the A.C power supply to the A.C load 4 and the driver 5 when the circuit receives the ground fault signal from the timer circuit 12. The relays 101 and 102 may be composed of, for example, a TRIAC or the like, which keeps current flowing status until the next trigger pulse is received, once a current has started flowing.

In FIGS. 7(a) through (d), FIG. 7(a) shows the the output voltage from the current difference detector 10, FIG. 7(b) shows the output current from the amplifier / rectifier circuit 11, FIG. 7(c) shows the output signal from the comparator circuit 12, and FIG. 7(d) shows the output signal from the timer circuit 13.

When the main switch 9 of the copying apparatus is turned on, the power is supplied through the A.C line 100 to the D.C power source 2. The D.C power source 2 supplies the electric power to the control circuit 23. The control circuit 23 closes the relays 101 and 102 after a predetermined time has passed, and supplies the electric power to the driver 5 and the A.C load 4.

Even if the ground fault does not occur, sometimes the high signal voltage as shown by $n_0$ in FIG. 7(a) is generated by noise, being caused by a sudden load change or the like. The signal results in the D.C signal as shown by $n_1$ in FIG. 7(b) through the amplifier / rectifier circuit 11, and the signal as shown by $n_2$ in FIG. 7(c) is outputted momentarily from the comparator circuit 12. However, if the continuance time of the signal does not exceed a predetermined time (T, for example, 1 msec.), the output from the timer circuit 13 is held at a low level, and the timer circuit does not output the ground fault signal.

When the ground fault accident occurs, the A.C signal as shown by $s_0$ in FIG. 7(a) is outputted from the current detector 10. By the A.C signal, the D.C signal as shown by $s_1$ in FIG. 7(b) is outputted from the amplifier / rectifier circuit 11. When the signal exceeds the reference value of the current (for example, 30 μA) at the time $t_1$, the output of the comparator circuit 12 is turned to a high level status. When the high level status continues to exceed the predetermined time (T=1 msec.), the ground fault signal is sent out to the control circuit 23 from the timer circuit 13. According to the above operation, the control circuit 23 opens the relays 101 and 102 to cut off the power supply to the A.C load 4 and the driver 5.

The D.C power source 2, which is a kind of the A.C load, is placed on a portion where there is no risk of the ground fault regarding the position of the A.C line 100, with an example that it is not placed near movable members.

As described above, in an earth leakage breaking circuit of a copying apparatus of the present invention comprising: a current difference detection means which detects the current difference between respective A.C lines to supply electric power from an A.C power source to loads; and a control circuit which detects an output signal, which is from the above-described current difference detection means and continuously exceeds a reference level, and turns off relays provided on the above-described A.C line, there are provided a timing signal generating means which generates the timing signal to start loading of the load, and a reference level generator means to change the above-described reference level based on the timing signal from the above-described timing signal generating means, and thereby it is possible to prevent an erroneous operation caused by noise, and the response time after a ground fault has been detected is not deteriorated, with an easy and simple circuit composition.

Further, the present invention has achieved to provide a copying apparatus comprising: a current difference detection means which detects a current difference between respective A.C lines which supply electric power from an A.C power source to electric loads; a detection circuit to which the above-described current difference detection means is connected; and a control circuit which detects a current which continuously exceeds a reference level in the above-described detection circuit, and turns off relays provided on the above-described A.C lines, wherein a non-volatile memory which records a control history of the above-described control circuit is provided, and thereby it is possible to prevent the restarting of the apparatus at the time of the occurrence of the earth leakage and to tell the occurrence of the earth leakage.

Yet further, in the safety circuit in a copying apparatus of the present invention, a relay which is a means to cut off the A.C load from the power source is used also as a relay to cut off the A.C load at the time of an automatic shut-off or a service-call, and thereby it is possible to prevent, in advance, the secondary accident caused by the ground fault and to provide a safety circuit of the copying apparatus which is reliable and is less expensive.

What is claimed is:

1. An earth leakage breaking circuit for use in a copying apparatus, comprising:
   (a) means for detecting a difference in current between an incoming current and an outgoing current in AC lines through which electric power from an AC power source is supplied to a plurality of loads in the copying apparatus;
   (b) means for breaking the current in the AC lines not supplying a secondary power source; and
   (c) a control circuit, including means for generating timings to start driving the plurality of loads and means for generating a reference level which varies in accordance with the generated timings, said control circuit activating said current breaking means when an output signal from said current difference detecting means exceeds the reference level for more than a predetermined period of time.

2. The earth leakage breaking circuit of claim 1, wherein said current breaking means includes one of a self-holding type relay, an electromagnetic type relay or a nonself-holding type relay.

3. An earth leakage breaking circuit for use in a copying apparatus, comprising:
   means for detecting a difference in current between an incoming current and an outgoing current in AC lines through which electric power from an AC power source is supplied to a plurality of loads in the copying apparatus;
   means for generating a plurality of timing signals for successively driving said plurality of loads;
   means for generating a reference level which is variable in accordance with said timing signals generated by said timing signal generating means;
   means for comparing the difference in current detected by said detecting means with said reference level; and
   means for breaking the current in the AC lines when the detected current difference exceeds said reference level for more than a predetermined period of time.

4. The earth leakage breaking circuit of claim 3, further comprising means for converting the difference in current detected by said detecting means to a voltage signal.

5. The earth leakage breaking circuit of claim 3, wherein said reference level generating means varies the reference level between a first reference level and a second reference level, said second reference level being generated for a second predetermined period of time when each of said plurality of timing signals drives each of said plurality of loads.

* * * * *